Dec. 15, 1925. 1,566,248
R. T. HENDRICKS ET AL
SHADE ROLLER
Filed Aug. 14, 1924
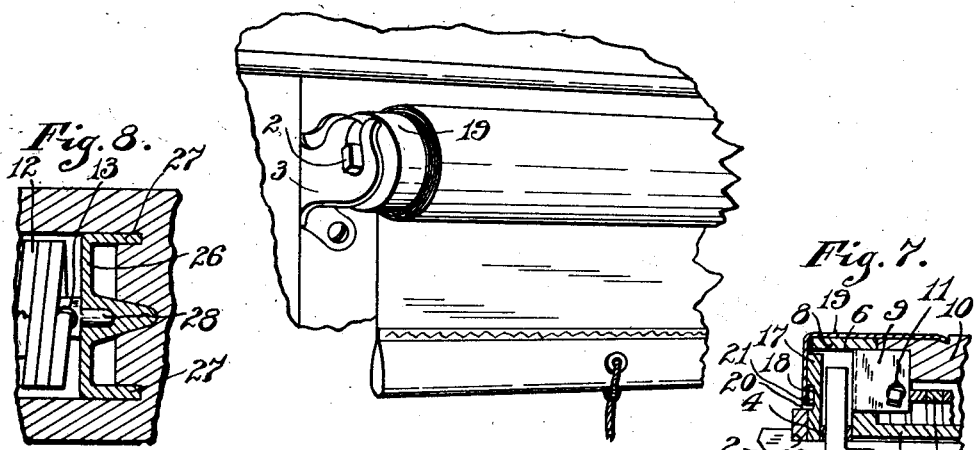
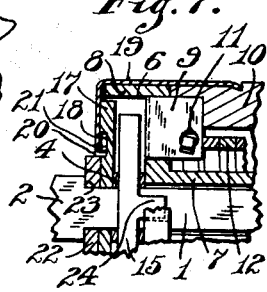
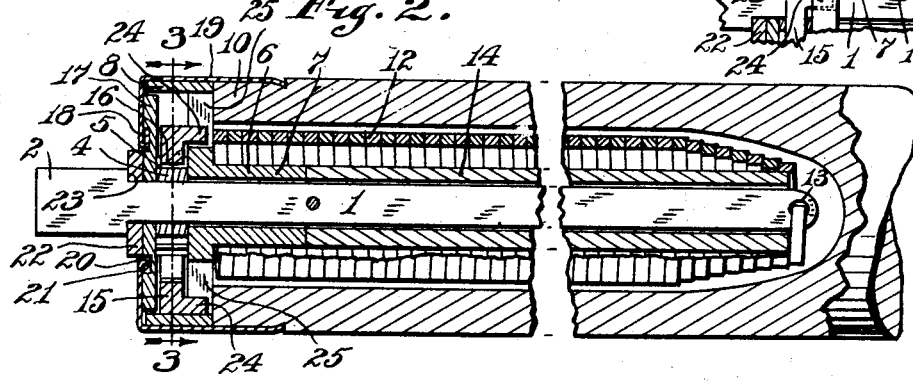
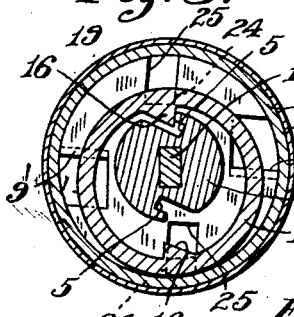
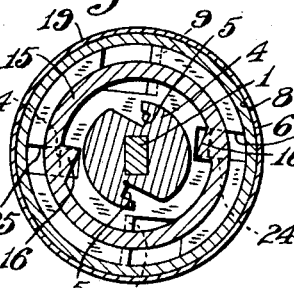
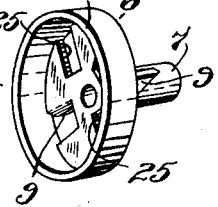
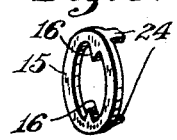
INVENTOR.
Ralph T. Hendricks and
Wilbur C. Patterson,
BY
Hood & Hahn
ATTORNEYS Patented Dec. 15, 1925.

1,566,248

UNITED STATES PATENT OFFICE.

RALPH T. HENDRICKS AND WILBUR C. PATTERSON, OF INDIANAPOLIS, INDIANA; SAID RALPH HENDRICKS ASSIGNOR TO SAID WILBUR C. PATTERSON, OF INDIANAPOLIS, INDIANA.

SHADE ROLLER.

Application filed August 14, 1924. Serial No. 731,971.

*To all whom it may concern:*

Be it known that we, RALPH T. HENDRICKS and WILBUR C. PATTERSON, citizens of the United States, residing at Indianapolis, in the county of Marion and State of Indiana, have invented a new and useful Shade Roller, of which the following is a specification.

Our invention relates to improvements in attachments for spring shade rollers and has for one of its objects the provision of means for inclosing the pawl and ratchet mechanism of a shade roller in such a manner as to form a practically dust-proof casing for said mechanism.

Another object of our invention is to provide an improved form of dogging mechanism which will be more positive in its action than those now in commercial use and which may be cheaply manufactured and readily assembled.

For the purpose of disclosing our invention we have illustrated one embodiment thereof in the accompanying drawings in which, Fig. 1 is a perspective view of one end of a shade roller embodying our invention;

Fig. 2 is a longitudinal sectional view of one end of the shade roller;

Fig. 3 is a sectional view taken on the line 3—3 of Fig. 2;

Fig. 4 is a similar view showing the parts in a different position;

Fig. 5 is a detail perspective of the inner cup;

Fig. 6 is a detail perspective of the dog ring;

Fig. 7 is a detail section showing the manner of securing the inner cup in position, and Fig. 8 is a detail section showing a means for centering the rear end of the spear.

In the embodiment of the invention illustrated we provide a spear 1 which is preferably formed of rectangular cross sectional shape and is provided with a squared portion 2 for engagement with the bracket 3. Surrounding this spear is a ratchet hub 4 having preferably two ratchet notches 5. This hub may be formed integrally with the spear or may be provided, as shown, with an opening having the same shape as the cross sectional shape of the spear and fitted on the spear so as to be held stationary therewith. Surrounding the spear and on the inner side of the hub 4 is a cup 6 preferably provided with a hub 7 and an annular peripheral flange 8. The hub 7 is large enough in diameter to permit a free rotation of the cup on the spear 1. Ears 9 are preferably struck up from the base of the cup and turned at right angles thereto, which ears are adapted to be driven into the end 10 of the shade roller to lock the cup to the shade roller so that the same will rotate therewith. One of these ears 9 is provided with an opening 11 into which is fastened one end of the coiled spring 12, the opposite end of the spring being secured in an opening 13 at the inner end of the spear 1. A suitable bushing 14, preferably formed of paper, surrounds the inner portion of the spear 1 to silence the spring during the operation of the roller.

Within the cup 6 we provide a dog ring 15 which surrounds the ratchet hub 4 and is provided with dogs 16, preferably two in number, to co-operate with the ratchet notches 5.

Surrounding the spear 1 on the outer side of the ratchet hub 4 is a disc 17 preferably having an annular groove 18 and co-operating with this disc is a cup cap 19 arranged to fit over the outer end of the roller. The bottom of this cup has a central opening 20 through which the portion 2 of the spear projects and surrounding this opening is an inturned annular lip 21 arranged to take into the groove 18. The disc 17 is preferably held in position by a washer 22 interposed between the shoulders 23 on the squared end 2 of the spear 1 so that the disc and the hub 4 are held in more or less snug relation, the hub 7 of the cup 6 forming an abutment for the parts at the rear. The ring 15 is caused to rotate with the cup 6 by the provision of a pair of rearwardly extending ears 24 which operate in elongated slots 25 in the bottom of the cup 6.

In operation, due to the fact that one end of the coil spring is connected to the stationarily held spear and the other end is to the shade roller, the spring is wound up in the usual manner by rotating the roller in one direction. During the rotation of the roller in this direction the dogs 16 of the ring 15 will not engage with the ratchet notches 5. However, when the spring tends to rotate the roller in the opposite direction, the dogs will co-operate with the notches in the manner usual in this type of structure.

It will be noted that by the provision of the cap 19 which co-operates with the disc 17 a practically dust proof housing is provided for the mechanism.

In some instances it may be desired to provide a supporting means for the rear end of the spear 1. Under such circumstances we provide a disc 26 having a plurality of rearwardly extending prongs 27 which may be driven into the wood of the roller. This disc is provided at a central point with a bearing opening adapted to receive a reduced end 28 of the spear.

We claim as our invention:

1. In a spring shade roller the combination with a shade roller, of a cup secured at one end of said roller to rotate therewith and having radial slots therein, a spear and a ratchet hub on said spear having oppositely and vertically disposed ratchet notches each provided with a straight wall and with an inclined wall, a one piece pawl ring surrounding said hub and having pawls arranged to be dropped by gravity into engagement with said ratchet notches and mounted within said cup, rearwardly extending fingers on said ring operating in said radially disposed notches to prevent the ring from rotating while permitting the same to move vertically relatively to said hub, and a closure cover for said cup.

2. In a shade roller the combination with a spear and a dogging mechanism on the end of said roller, of a cover cap mounted on said roller inclosing said dogging mechanism and having a central aperture for the projection of the end of said spear, and a disc mounted on said spear, stationary with respect to said cap and arranged to close said aperture said disc having an opening through which said spear projects for engagement with the fixture.

3. In a shade roller the combination with a spear and a dogging mechanism, of a cover cap mounted on the end of the roller and inclosing said dogging mechanism, said cap having a central aperture for the projection of said spear, a disc mounted on said spear, stationary with respect to said cap, for closing said opening, said cap and disc having relative movement and said disc and cap having annular interlocking parts for the exclusion of foreign particles from said cover.

4. The combination with a shade roller, of a spear mounted in one end thereof, a cup open at its outer end secured on the end of said roller and forming a portion of a casing, a second cup mounted on the end of said roller and telescoping said first mentioned cup and closing the outer end of said cup, a dogging mechanism mounted within the casing formed by said cups, said second mentioned cup having a central aperture for the projection of the spear and a closure disc stationarily mounted on the spear and adapted to close said aperture.

In witness whereof, we have hereunto set our hands at Indianapolis, Indiana, this 11th day of August, A. D. one thousand nine hundred and twenty four.

RALPH T. HENDRICKS.
WILBUR C. PATTERSON.